United States Patent
Illers et al.

(10) Patent No.: US 8,345,260 B2
(45) Date of Patent: Jan. 1, 2013

(54) METHOD OF DETECTING A MOVEMENT OF A MEASURING PROBE AND MEASURING INSTRUMENT

(75) Inventors: Hartmut Illers, Hahausen (DE); Kazuhiko Hidaka, Veldhoven (NL); Akinori Saito, Tsukuba (JP); Hans Ullrich Danzebrink, Braunschweig (DE)

(73) Assignees: Mitutoyo Corporation, Kawasaki (JP); Bundesrepublik Deutschland, Endvertreten Durch den Prasidenten der Physikalisch-Technischen Bundesan, Braunschweig (DE)

( * ) Notice: Subject to any disclaimer, the term of this patent is extended or adjusted under 35 U.S.C. 154(b) by 628 days.

(21) Appl. No.: 12/461,810

(22) Filed: Aug. 25, 2009

(65) Prior Publication Data
US 2010/0067021 A1 Mar. 18, 2010

(30) Foreign Application Priority Data
Sep. 16, 2008 (EP) .................................... 08016297

(51) Int. Cl.
*G01B 11/02* (2006.01)
(52) U.S. Cl. ........................................ 356/501; 356/498
(58) Field of Classification Search .................. 356/73, 356/489, 495, 496, 201, 511, 514, 600, 487, 356/491, 493, 497, 498, 512, 501; 250/234, 250/306–311
See application file for complete search history.

(56) References Cited

U.S. PATENT DOCUMENTS

| | | | |
|---|---|---|---|
| 3,848,159 A | 11/1974 | Nye, Jr. et al. |
| 4,270,061 A | 5/1981 | Gronner et al. |
| 4,732,483 A | 3/1988 | Biegen |
| 5,274,704 A | 12/1993 | Jakab |
| 5,305,158 A | 4/1994 | Ueda et al. |
| 5,477,135 A | 12/1995 | Baker |
| 5,621,656 A | 4/1997 | Langley |

(Continued)

FOREIGN PATENT DOCUMENTS
DE 297 14 612 U1 10/1997
(Continued)

OTHER PUBLICATIONS
Development of a scanning probe microscope compact sensor head featuring a diamond probe mounted on a quartz tuning fork. Tyrrell et al. Measurement Science and Technology. 2003. vol. 14, pp. 2139-2143.
(Continued)

*Primary Examiner* — Tarifur Chowdhury
*Assistant Examiner* — Michael P Lapage
(74) *Attorney, Agent, or Firm* — Oliff & Berridge, PLC

(57) ABSTRACT

A method of detecting a movement of a measuring probe provided between an objective lens adapted to image an object plane on a predetermined image plane and the object plane is disclosed. Additionally, a measuring instrument comprising an objective lens and a measuring probe is disclosed. An input beam of light is split into a measurement beam and a reference beam. The measurement beam is focused on a reverse focal plane of the objective lens such that the measurement beam is collimated by the objective lens. The collimated measurement beam is reflected at the measuring probe. The reflected measurement beam is directed towards the objective lens such that the objective lens focuses the reflected measurement beam on the reverse focal plane. The reflected measurement beam is collimated. The collimated reference beam and the reference beam are superimposed to form a superimposed beam and an interference between the reflected measurement beam and the reference beam is detected.

15 Claims, 7 Drawing Sheets

U.S. PATENT DOCUMENTS

| | | | |
|---|---|---|---|
| 5,778,081 A | | 7/1998 | Patrick |
| 5,781,294 A | * | 7/1998 | Nakata et al. .................. 356/487 |
| 5,798,927 A | | 8/1998 | Cutler et al. |
| 5,799,049 A | | 8/1998 | McFarland et al. |
| 6,002,232 A | | 12/1999 | McConnell et al. |
| 6,296,093 B1 | | 10/2001 | Norris et al. |
| 6,566,854 B1 | | 5/2003 | Hagmann et al. |
| 6,800,864 B2 | | 10/2004 | Scaman |
| 7,501,783 B2 | | 3/2009 | Imadu et al. |
| 2003/0095354 A1 | | 5/2003 | Atsumi et al. |
| 2004/0267407 A1 | | 12/2004 | Ogura et al. |
| 2005/0119795 A1 | | 6/2005 | Morisada |
| 2005/0126849 A1 | | 6/2005 | Pearson et al. |
| 2006/0109480 A1 | | 5/2006 | Hidaka |
| 2006/0186876 A1 | | 8/2006 | Proksch et al. |
| 2007/0046366 A1 | | 3/2007 | Hinrichs et al. |
| 2007/0105504 A1 | | 5/2007 | Vorenkamp et al. |
| 2008/0049233 A1 | * | 2/2008 | De Groot ...................... 356/511 |
| 2008/0051942 A1 | | 2/2008 | Smith et al. |
| 2008/0277582 A1 | | 11/2008 | Shi et al. |
| 2009/0079441 A1 | | 3/2009 | Cathelin et al. |
| 2009/0262421 A1 | | 10/2009 | Buican |
| 2010/0007881 A1 | * | 1/2010 | Shyu et al. .................... 356/364 |

FOREIGN PATENT DOCUMENTS

| | | |
|---|---|---|
| DE | 101 12 316 A1 | 12/2001 |
| EP | 0 527 601 A1 | 2/1993 |
| EP | 1 653 478 A2 | 5/2006 |
| EP | 1 860 396 A1 | 11/2007 |
| GB | 2 388 914 A | 11/2003 |
| JP | A-2002-162219 | 6/2002 |
| WO | WO 01/22409 A1 | 3/2001 |
| WO | WO 2007/101133 A2 | 9/2007 |
| WO | WO 2008/138873 A1 | 11/2008 |

OTHER PUBLICATIONS

PZT Components. Piezotechnology. 2009. http://www.piceramic.de/site/picomp_004.html and http://www.piceramic.de/site/picomp_005.html.

Mar. 1, 2012 Office Action issued in U.S. Appl. No. 12/588,204.

Apr. 8, 2011 Office Action issued in EP 08 021 930.6.

"Input Shaping: A New Control Strategy to Eliminate Residual Vibrations." pp. 1-4. Convolve. New York City, NY, Aug. 19, 2000.

"Position & Bewegung 25." www.phsikinstrumente.de. pp. 1-8, Dec. 12, 2006.

A. J. Den Boef. "Scanning Force Microscopy Using a Simple Low-Noise Interferometer." Phillips Research Laboratories. May 19, 1989. The Netherlands. pp. 1-2.

Mar. 26, 2009 Search Report issued in EP 08 02 1930.

Jun. 26, 2009 Search Report issued in EP 09 00 0438.

Feb. 25, 2009 Search Report issued in EP 08 01 6297.

Jul. 31, 2008 Search Report issued in EP 08 00 9133.

Jul. 31, 2008 Search Report issued in EP 08 00 9131.

U.S. Appl. No. 12/588,204, filed Oct. 7, 2009. Hans-Ulrich Danzebrink et al.

* cited by examiner

METHOD OF DETECTING A MOVEMENT OF A MEASURING PROBE AND MEASURING INSTRUMENT

The present invention generally relates to the technical field of measuring instruments, in particular to scanning microscopes such as, for example, atomic force microscopes, scanning tunneling microscopes and optical near-field microscopes, as well as to coordinate measuring machines. In particular, the present invention relates to a method of detecting a movement of a measuring probe and to a measuring instrument comprising a measuring probe.

In modern technology, components having dimensions of the order of magnitude of micrometers or less are employed. Examples of such components include components of micro-electro-mechanical systems (MEMS) and magnetic read/write heads for hard disks. The quality of such components may be influenced by the level of roughness of the surface of the components on length-scales on the order of magnitude of nanometers. In order to assess the quality of the components, it is desirable to perform measurements both on length scales of micrometers and on length scales of nanometers.

Scanning probe microscopy techniques such as atomic force microscopy, scanning tunneling microscopy and optical near field microscopy are able to resolve details having dimensions of the order of magnitude of nanometers. In response to the availability of increasingly robust systems, their industrial application is becoming widespread. The field of view accessible by means of techniques of scanning microscopy, however, is limited by the relatively slow scan speed of scanning microscopes according to the state of the art.

Optical far-field microscopy, on the other hand, allows fast measurements over a relatively large field of view of up to an order of magnitude of millimeters. The resolution of optical far-field microscopy, however, is limited by diffraction. Therefore, features smaller than the wavelength of light may not be resolved by optical far-field microscopy. Therefore, it has been proposed to combine an optical microscope and a scanning microscope into a single instrument.

EP 1653478 A2 discloses an instrument according to the state of the art which will be described with reference to FIG. 1 in the following. The instrument 100 comprises a surface texture measuring probe 160 which is provided between an objective lens 111 of an optical observation unit 110 and a workpiece 101 which is to be investigated by the instrument 100.

In addition to the objective lens 111, the optical observation unit 110 includes a half-mirror 112 arranged on an optical path L1 of the objective lens 111, a camera 113 arranged on the optical path L1 of the objective lens 111 to image light reflected from the workpiece 101 and transmitted through the half-mirror 112 and a light source 114 arranged on an optical axis L2 orthogonal to the optical axis L1 of the objective lens 111 to irradiate the workpiece 101 via the half-mirror 112 and the objective lens 111. The optical observation unit 110 allows an investigation of the workpiece 101 by means of optical far-field microscopy.

The instrument 100 further comprises a near-field measuring unit 130 including an actuator 132 that displaces a holder 131 holding the objective lens 111 along the optical axis L1, the surface texture measuring probe being arranged integrally with the holder 131 and fixed near the objective lens 111, a half-mirror 134 arranged on the optical axis L1 of the objective lens 111, a laser source 135 arranged on an optical axis L4 orthogonal to the optical axis L1 of the objective lens 111, a half-mirror 136 arranged on the optical axis L1 of the objective lens 111, a mirror 137 arranged on an optical axis L41 orthogonal to the optical axis L4 to reflect the reflected light from the half-mirror 136, a photon detector 138 that receives reflected light from the mirror 137 and a demodulator that demodulates the output signal from the photon detector 138. Additionally, the instrument 100 comprises a drive controller 140 that controls the operation of a relative movement unit 103 to move the workpiece 101 provided on a table 102 such that the surface texture measuring probe 160 is moved along the surface of the workpiece 101.

In the operation of the optical near-field measuring unit 130, light from the laser source 135 is supplied to the measuring probe 160 by the half-mirrors 134, 136 and forms an optical near-field in the vicinity of a measuring tip provided in the measuring probe 160. Light from the tip of the measuring probe 160 is directed to the photon detector 138 by the half-mirrors 134, 136 and the mirror 137. The measuring probe 160 is vibrated such that the distance between the measuring tip and the workpiece 101 is varied in a periodic manner. Since the optical near-field interacts with the workpiece 101 and the interaction between the optical near-field and the workpiece 101 may depend on the distance between the measuring tip and the surface of the workpiece, the intensity of light from the measuring tip received by the photon detector 138 may vary in a periodic manner as the measuring probe 160 is vibrated.

An output signal from the photon detector 138 is demodulated by the demodulator 139 and input to the drive controller 140. The drive controller 140 controls the operation of the relative movement unit 103 to move the workpiece 101 such that the surface measuring probe 160 is moved along the surface of the workpiece 101, and drives the actuator 132 such that the output of the demodulator 139 becomes constant. Thus, when the movement position along the surface of the workpiece 101 and the amount of motion of the measuring probe 160 caused by the actuator 132 are obtained, the surface texture of the workpiece 101 can be measured.

A problem of the instrument 100 according to the state of the art is that a precision of the measurement of the surface texture of the workpiece 101 may be limited by the precision of the measurement of the amount of motion of the measuring probe 160 caused by the actuator 132.

A further problem of the measuring instrument 100 according to the state of the art is that light from the laser source 135 reflected at the measuring probe 160 and/or the workpiece 101 may be transmitted through the half-mirrors 112, 134, irradiating the camera 113. Similarly, light from the light source 114 reflected at the workpiece 101 and/or the measuring probe 160 may be reflected by the half-mirrors 134, 136 and the mirror 137, irradiating the photon detector 138. Therefore, the observation of the workpiece 101 by means of the optical observation unit 110 and the measurement of the surface texture by means of the near-field measuring unit 130 may adversely affect each other when performed simultaneously. This may make a simultaneous observation of the workpiece 101 by means of the optical observation unit 110 and a measurement of the surface texture by means of the optical near-field measuring unit 130 difficult.

It is an object of the present invention to provide a measuring method and a measuring instrument wherein a precision of the measurement of a surface texture of a workpiece may be improved.

It is a further object of the present invention to provide a measuring method and a measuring instrument which allows a simultaneous investigation of a workpiece by means of optical far field microscopy and scanning microscopy.

According to one aspect of the present invention, a method of detecting a movement of a measuring probe provided between an objective lens adapted to image an object plane on a predetermined image plane and the object plane comprises splitting an input beam of light into a measurement beam and a reference beam. The measurement beam is focused on a reverse focal plane of the objective lens such that the measurement beam is collimated by the objective lens. The collimated measurement beam is reflected at the measuring probe, the reflected measurement beam being directed towards the objective lens. The objective lens focuses the reflected measurement beam on the reverse focus plane. The reflected measurement beam is collimated and superimposed with the reference beam to form a superimposed beam. An interference between the reflected measurement beam and the reference beam is detected.

The method of the present invention allows an interferometric detection of the motion of the measuring probe. By focusing the measurement beam on the reverse focal plane of the objective lens, a collimated beam of light whose rays are substantially parallel can be obtained at the object side of the objective lens where the measuring probe is provided. At the measuring probe, the measurement beam can be reflected back towards the objective lens. Since the measurement beam obtained on the object side of the objective lens is collimated, the reflected measurement beam may also be collimated and can be focused on the reverse focus plane of the objective lens by the objective lens. Thereafter, it may be collimated again by further optical elements, wherein the collimation of the reflected measurement beam is substantially independent of the distance between the measuring probe and the objective lens.

The position of the measuring probe, however, may have an influence on the length of the optical path of the measurement beam and the reflected measurement beam. Therefore, the phase difference between the reflected measurement beam and the reference beam is influenced by the position of the measuring probe. By detecting the interference between the reflected measurement beam and the reference beam, the position of the measuring probe and/or variations thereof may be measured. Since interferometric measurements of distance can be very precise, a precise measurement of the motion of the measuring probe can be obtained.

In some embodiments, the reference beam may be reflected by a reference mirror before being superimposed with the reflected measurement beam.

In some embodiments, a polarizing beam splitter can be utilized for splitting the input beam. The polarizing beam splitter can be adapted such that the measurement beam and the reference beam are linearly polarized, wherein an initial polarization direction of the measurement beam is orthogonal to an initial polarization direction of the reference beam. The polarization state of the measurement beam and the reflected measurement beam is modified such that a polarization direction of the reflected measurement beam is orthogonal to the initial polarization direction of the measurement beam, for example by means of a lambda quarter plate which is passed both by the measurement beam and the reflected measurement beam. Similarly, the polarization state of the reference beam is modified to obtain a polarization direction of the reference beam orthogonal to the initial polarization direction of the reference beam. In some embodiments, an optical element such as a lambda quarter plate may be used for this purpose. The polarization states are modified before forming the superimposed beam.

When the measurement beam and/or the reflected measurement beam are transmitted through optical elements such as, for example, lenses of the objective lens, a portion of the measurement beam may be reflected. Such reflections may superimpose with the measurement beam and/or the reflected measurement beam and might, in some applications, adversely affect the precision of the interferometric measurement of the motion of the measuring probe.

The polarization direction of light of the measurement beam which is reflected at an optical element may be substantially identical to the polarization direction of the measurement beam, thus being different from the modified polarization direction of the reflected measurement beam.

Light of the reflected measurement beam which is reflected after the modification of the polarization state of the measurement beam and the reflected measurement beam may have substantially the same polarization direction as the reflected measurement beam. Since, however, this light is reflected towards the measuring probe, such light is affected by the modification of the polarization state for a second time when it is reflected into the direction of propagation of the reflected measurement beam at the measuring probe.

Thus, undesirable reflections at optical elements may have a polarization direction which is different from the polarization direction of the reflected measurement beam, and can be reduced by means of a polarizer. In some embodiments, the polarizing beam splitter may be employed for this purpose. Modifying also the polarization state of the reference beam allows to provide orthogonal polarization directions of the reflected measurement beam and the reference beam when the reflected measurement beam and the reference beam are superimposed.

In some embodiments, the polarization states of the measurement beam and the reflected measurement beam can be modified between the objective lens and the measuring probe. Thus, all reflections of the measurement beam occurring at optical elements of the objective lens occur before the modification of the polarization state of the measurement beam. This may help to substantially eliminate or reduce all reflections occurring at optical elements of the objective lens.

In some embodiments, the input beam may comprise at least one of unpolarized light, elliptically polarized light an linearly polarized light having a polarization direction intermediate the initial polarization direction of the measurement beam and the initial polarization direction of the reference beam.

In some embodiments, a first polarization component of the superimposed beam is selected. In some embodiments, the selection may be done by means of a polarization sensitive element, for example a polarization filter, or a polarizing beam splitter, operated as an analyzer. The first polarization component has a polarization direction intermediate the polarization direction of the reflected measurement beam after the modification of the polarization state of the reflected measurement beam and the polarization direction of the reference beam after the modification of the polarization direction of the reference beam.

The polarization state of the superimposed beam may depend on the phase difference between the reflected measurement beam and the reference beam. For example, if the reflected measurement beam and the reference beam are in phase and the intensities of the reflected measurement beam and the reference beam are substantially equal, the superimposed beam may be linearly polarized having a polarization direction including an angle of approximately 45 degrees with the polarization direction of the reference beam.

If the reflected measurement beam and the reference beam are inversely phased, the polarization direction of the superimposed beam may include an angle of approximately 135 degrees with the polarization direction of the reference beam in the case of equal intensities of the reflected measurement beam and the reference beam. Hence, in this case, the polarization direction of the superimposed beam is orthogonal to the polarization direction that is obtained if the reflected measurement beam and the reference beam are in phase. For other phase differences between the reflected measurement beam and the reference beam, an elliptical polarization of the superimposed beam may be obtained. Therefore, the intensity of the first polarization component of the superimposed beam may have a substantially cosinusoidal dependence on the phase difference between the reflected measurement beam and the reference beam, which is representative of the position of the measuring probe.

In some embodiments, a second polarization component of the superimposed beam having a polarization direction orthogonal to the first polarization component can be selected, and an intensity of the second polarization component can be measured. Similar to the intensity of the first polarization component, the intensity of the second polarization component may depend on the phase difference between the reflected measurement beam and the reference beam. Since, however, the polarization directions of the first and the second polarization component are orthogonal, the dependence of the intensity of the second polarization component on the phase difference can be sinusoidal if the dependence of intensity of the first polarization component on the phase difference is cosinusoidal. Hence, in case of an alteration of the position of the measuring probe, the direction of movement of the measuring probe can be determined from the measured intensities of first and the second polarization component, and the precision of the measurement can be improved compared to embodiments wherein only the intensity of the first polarization component is measured.

In some embodiments, the input beam comprises light within a predetermined wavelength band. A wavelength selective mirror adapted to reflect light within the predetermined wavelength band is provided along an optical axis of the objective lens. The wavelength selective mirror is arranged between the objective lens and the image plane. The measurement beam is reflected into a direction parallel to the optical axis of the objective lens toward the objective lens by means of the wavelength selective mirror. The reflected measurement beam from the objective lens is reflected into a direction angled to the optical axis of the objective lens by means of the wavelength selective mirror. An object located in the object plane is imaged by means of the objective lens using light having a wavelength outside the predetermined wavelength band.

Since the wavelength selective mirror reflects light having the wavelength used in the interferometric measurement of the position of the measuring probe into a direction angled to the optical axis of the objective lens, substantially no light from the measurement beam may reach the image plane of the objective lens where the image of the object to be investigated is formed. Thus, imaging the object and measuring the position of the measuring probe can be performed simultaneously, and an adverse influence of the light of the reflected measurement beam on the observation of the object can be reduced or substantially avoided.

A measuring instrument according to the present invention comprises an objective lens adapted to image an object plane on a predetermined image plane. The measuring instrument further comprises a light source adapted to emit an input beam, a beam splitter adapted to split the input beam into a measurement beam and a reference beam, means for focusing the measurement beam on a reverse focal plane of the objective lens such that the measurement beam is collimated by the objective lens and a reference reflector adapted to reflect the reference beam towards the beam splitter. Additionally, the measuring instrument comprises a measuring probe. The measuring probe comprises a reflective element which is located between the objective lens and the object plane. The reflective element is adapted to reflect the collimated measurement beam back to the objective lens such that the objective lens focuses the reflected measurement beam on the reverse focal plane and the means for focusing the measurement beam direct the reflected measurement beam towards the beam splitter. The beam splitter is adapted to superimpose the reflected reference beam and the reflected measurement beam to form a superimposed beam. The measuring instrument further comprises means for detecting an interference of the reflected reference beam and the reflected measurement beam superimposed with each other.

The beam splitter, the reference mirror and the reflective element of the measuring probe form an interferometer wherein a difference of the length of the optical path of the measurement beam and the reflected measurement beam on the one hand and the optical path length of the reference beam and the reflected reference beam on the other hand leads to a phase difference between the reflected measurement beam and the reflected reference beam. Since the length of the optical path of the measurement beam and the reflected measurement beam may depend on the position of the measuring probe, the phase difference, which may be determined by detecting the interference between the reflected reference beam and the reflected measurement beam, is representative of the position of the measuring probe. The means for focusing the measurement beam on the reverse focus plane of the objective lens and the objective lens form a collimated measurement beam at the location of the measuring probe, and collimate the reflected measurement beam. Thus, a precise interferometric measurement of the position of the measuring probe can be performed. Additionally and, in some embodiments, simultaneously, and image of an object to be investigated can be formed at the image plane for inspection of the object, while the measuring probe may be employed for performing scanning microscopy or for the measurement of coordinates of portions of the object.

In some embodiments, the beam splitter comprises a polarizing beam splitter. The polarizing beam splitter is adapted to form a linearly polarized measurement beam and a linearly polarized reference beam, wherein an initial polarization direction of the measurement beam is orthogonal to an initial polarization direction of the reference beam. Between the objective lens and the measuring probe, means for modifying the polarization state of the measurement beam and the reflected measurement beam are provided such that a polarization direction of the reflected measurement beam is orthogonal to the initial polarization direction of the measurement beam. The measuring instrument further comprises means for modifying a polarization state of the reference beam and the reflected reference beam such that a polarization direction of the reflected measurement beam is orthogonal to the initial polarization direction of the reference beam. This may help to reduce adverse effects caused by undesirable reflections of the measurement beam and/or the reference beam at optical elements such as, for example, components of the objective lens.

In some embodiments, the light source is adapted to provide at least one of an unpolarized input beam, an elliptically polarized input beam and a linearly polarized input beam having a polarization direction intermediate the polarization direction of the measurement beam and the polarization direction of the reference beam.

In some embodiments, the polarizing beam splitter is adapted to reflect light having a polarization direction lying in a first plane and to transmit light having a polarization direction lying in a second plane orthogonal to the first plane. Thus, the measurement beam and the reference beam being orthogonally polarized may be provided in a convenient manner, and the reflected measurement beam and the reflected measurement beam may be superimposed in a convenient manner.

In some embodiments, the means for detecting an interference of the reflected reference beam and the reflected measurement beam comprise a first detector adapted to produce a first signal representative of an intensity of light impinging thereon and a polarizer. The polarizer is adapted to select light having a third polarization direction intermediate the polarization direction of the reflected measurement beam obtained after the modification of the polarization of the measurement beam and the polarization direction of the reflected reference beam obtained after the modification of the polarization of the reflected measurement beam, and to supply the light having the third polarization direction to the first detector. Thus, a signal having a sinusoidal or cosinusoidal dependence on the position of the measuring probe may be created.

In some embodiments, the means for detecting an interference of the reflected reference beam and the reflected measurement beam further comprise a second detector adapted to produce a second signal representative of an intensity of light impinging thereon. The polarizer is further configured to select light having a fourth polarization direction orthogonal to the third polarization direction and to supply the light having the fourth polarization direction to the second detector. Thus, a signal having a sinusoidal or a cosinusoidal dependence on the position of the measuring probe which is phase-shifted relative to the first signal can be created, which may help to improve a precision of the measurement and may allow to determine a direction of the movement of the measuring probe.

In some embodiments, the polarizer comprises a polarizing beam splitter adapted to reflect one of the light having the third polarization direction and the light having the fourth polarization direction and to transmit the other of the light having the third polarization direction and the light having the fourth polarization direction. Thus, a polarizer adapted for selecting the light having the third polarization direction and the light having the fourth polarization direction may be provided in a convenient manner.

In some embodiments, the light source is adapted to emit light within a predetermined wavelength band, and the means for focusing the measurement beam comprise a focusing optical element adapted to focus the measurement beam and a wavelength selective mirror. The wavelength selective mirror is arranged along an optical axis of the objective lens, and is adapted to reflect light within the predetermined wavelength band. The wavelength selective mirror is oriented such that light from the focusing optical element is reflected towards the objective lens. Light from an object provided in the object plane of the objective lens having a wavelength outside the predetermined wavelength band, for example light from a workpiece to be scanned by the measuring probe, may be transmitted through the wavelength selective mirror such that it is focused on the image plane of the objective lens. Thus, the objective lens may simultaneously be used for forming an image of the object at the image plane and for interferometrically detecting a motion of the measuring probe.

In the following, embodiments of the present invention will be described with reference to the enclosed figures, wherein:

FIG. 2b shows a schematic view of an optical path in the measuring instrument shown in FIG. 2a;

FIG. 2a shows a schematic cross-sectional view of a measuring instrument 200 according to an embodiment of the present invention.

Figure 1:
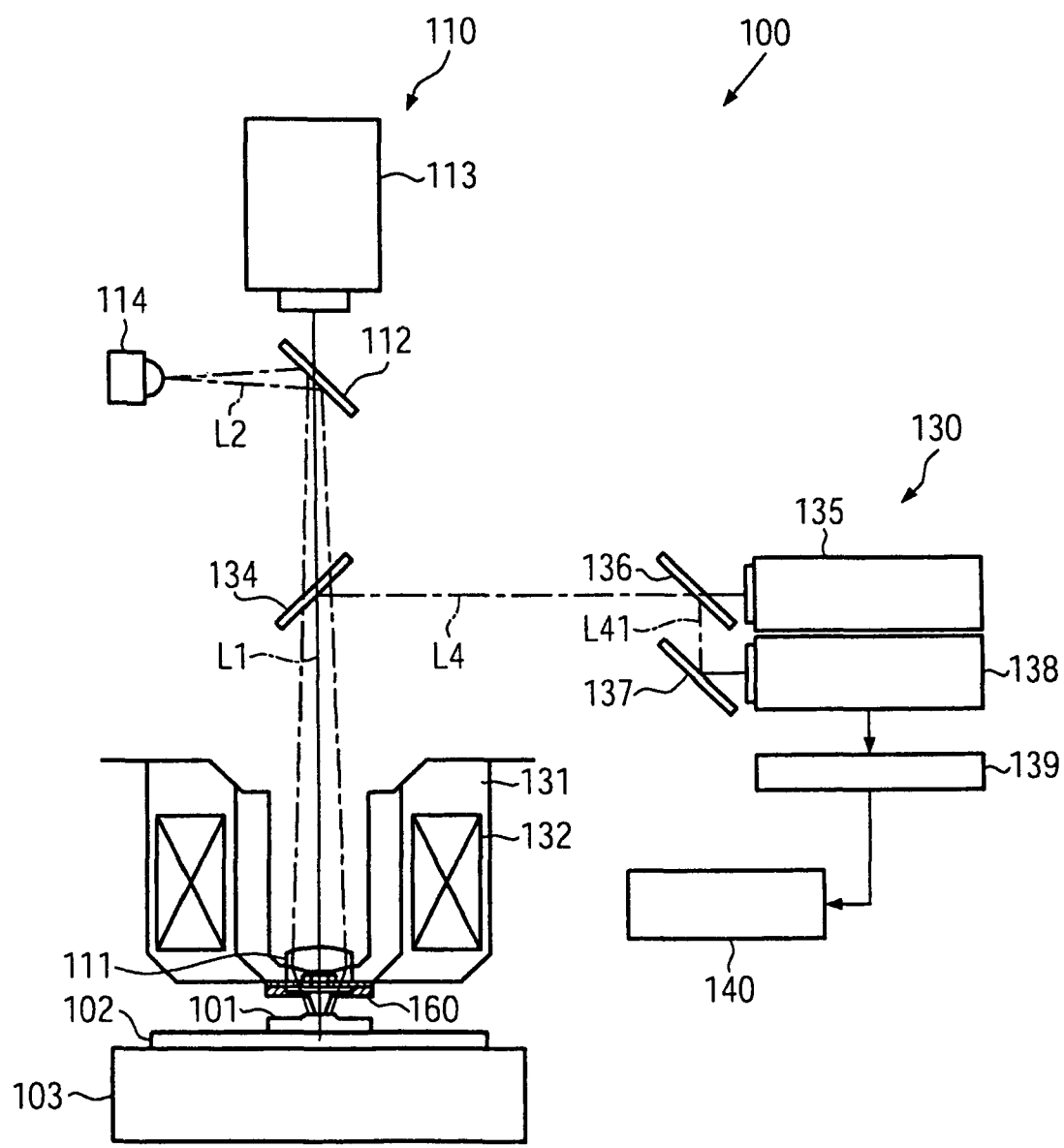
FIG. 1 shows a schematic cross-sectional view of a measuring instrument according to the state of the art.

The measuring instrument 200 comprises a measuring probe 260. The measuring probe 260 can be configured for measurements using techniques of scanning microscopy such as atomic force microscopy, scanning tunneling microscopy and/or optical near field microscopy. The measuring probe 260 may comprise a measuring tip 262 adapted for scanning a surface of an object 201 to be investigated and a reflective element 261 provided on a side of the measuring probe 260 opposite the measuring tip 262.

In some embodiments, the measuring probe 260 may have a configuration corresponding to that of the surface texture measuring probe disclosed in EP 1 653 478 A2 and described above with reference to FIG. 1. In other embodiments, the measuring probe 260 may comprise a atomic force microscopy cantilever of a type well known to persons skilled in the art. In such embodiments, the measuring tip 262 may be formed integrally with the cantilever. In still further embodiments, the measuring probe 260 may have a configuration corresponding to that disclosed in European Patent Application No. 08009133.3 or a configuration corresponding to that disclosed in European Patent Application No. 08009131.7.

In still further embodiments, the measuring probe 260 can comprise a scanning tunneling microscopy tip of a type well known to persons skilled in the art.

The present subject matter is not restricted to embodiments wherein the measuring probe 260 is adapted for scanning microscopy. In other embodiments, the measuring probe can comprise a measuring sensor of a coordinate measuring machine known to persons skilled in the art.

In some embodiments, the reflective element 261 of the measuring probe 260 can comprise a substantially planar surface on a side of the measuring probe 260 opposite the measuring tip 262. In some of these embodiments, the reflective element 261 can comprise a reflective coating which may, for example, be formed of a reflective material such as aluminum. In other embodiments, the reflective element 261 may comprise a dielectric mirror formed of a plurality of dielectric layers having a different index of refraction. The materials, number and thickness of the dielectric layers may be adapted such that a relatively large fraction of light within a desired wavelength range is reflected. In further embodiments, the reflective element 261 may comprise a retroreflector adapted to reflect incident light into a direction opposite the direction of incidence, for example a cateye reflector. The measuring instrument 200 further comprises a table 202 on which the object 201 can be mounted, as well as a relative movement unit 203 configured to move the table 202.

In some embodiments, the relative movement unit 203 can be configured to move the table 202 in two substantially orthogonal horizontal directions and in a vertical direction substantially orthogonal to the horizontal directions.

Additionally, the measuring instrument 200 comprises an optical observation unit 210 comprising an objective lens 211, a partially transmissive mirror 212 arranged along an optical axis A1 of the objective lens 211, and an image acquisition unit 213.

In some embodiments, the image acquisition unit 213 may comprise a camera, for example a CCD camera of a type known to persons skilled in the art, or a camera comprising a photographic film. In other embodiments, an ocular may be provided instead of the camera 213 for visual inspection of the object 201.

The optical observation unit 210 comprises a predetermined image plane 254 substantially perpendicular to the optical axis A1. In embodiments wherein the optical observation unit 210 comprises a camera, a sensor element of the camera may be provided in the image plane 254. In embodiments wherein the optical observation unit comprises an ocular, the ocular can be adapted to collimate rays which intersect each other in the image plane 254. Furthermore, the optical observation unit 210 comprises an object plane 250. Rays of light running through a point lying in the object plane 250 are focused to an image point lying in the image plane 254 by the objective lens 211. Thus, the objective lens 211 is adapted to form an image of a portion of the object 201 lying in the object plane 250 at the image plane 254, wherein the image may be observed and/or recorded by means of the image acquisition unit 213.

The objective lens 211 comprises a focal plane 251 passing through a focal point of the objective lens 211 and being perpendicular to the optical axis A1, as well as a reverse focal plane 252 passing through a reverse focal point of the objective lens 211. The focal plane 251 of the objective lens 211 is located on the same side of the objective lens 211 as the object plane 250 and the reverse focal plane 252 of the objective lens 211 is located on the same side of the objective lens 211 as the image plane 254.

Rays of light running through a point lying in the focal plane 251 of the objective lens 211 are collimated by the objective lens such that substantially parallel rays are obtained on the side of the objective lens 211 opposite the focal plane. Similarly, rays of light running through the reverse focal plane 252 of the objective lens 211 are collimated such that substantially parallel rays are obtained on the side of the objective lens 211 opposite the reverse focal plane 252.

In some embodiments, in particular in embodiments wherein the measuring probe 260 is adapted for investigating the object 201 by means of techniques of scanning microscopy, the objective lens 211 can be a microscope objective of a type known to persons skilled in the art. In other embodiments, the objective lens may comprise a macro objective lens or a measurement objective lens, or any other type of objective lens known to persons skilled in the art. In particular, in embodiments wherein the measuring probe 260 comprises a measuring sensor of a coordinate measuring machine, an objective lens 211 providing a relatively large distance between a front lens of the objective lens 211 and the object plane 250 may be used.

The measuring instrument 200 may further comprise a holder 231, wherein the objective lens 211 is connected to the holder 231. Additionally, the measuring probe 260 can be connected to the holder 231 by means of a support structure 263, wherein the measuring probe 260 is provided between the objective lens 211 and the object plane 251. In some embodiments, the measuring tip 262 may be located on the optical axis A1 of the objective lens 211. The support structure 263 may comprise a plurality of beams and/or a transparent element such as a plane-parallel glass plate. A diameter of the measuring probe 263 in horizontal directions perpendicular to the optical axis A1 may be smaller than the diameter of the objective lens 211. Thus, the measuring probe 260 and the support structure 263 do not cover the entire aperture of the objective lens 211 and the object 201 may be inspected by means of the optical observation unit 210 in spite of the presence of the measuring probe 260.

The optical observation unit 210 may further comprise a light source 214 arranged on an optical axis A2, which can be substantially orthogonal to the optical axis A1. Light emitted by the light source 214 can be directed along the optical axis A2 by the partially transmissive mirror 212. The arrangement of the light source 214, the partially transmissive mirror 212 and the objective lens can be adapted such that a portion of the object 201 is illuminated by light from the light source 214 through the objective lens 211.

An actuator 232 which may, for example, comprise a piezoelectric actuator may be adapted to move the measuring probe 260 comprising the reflective element 261 in the vertical direction. Thus, a distance between the object 201 on the one hand and the measuring probe 260 on the other hand may be varied by operation of the actuator 232. As the actuator 232 is operated, the position of the measuring probe 260, in particular the position of the reflective element 261, can be varied.

The measuring instrument 200 may further comprise a drive controller 240 adapted to control the actuator 232 in accordance with a signal representative of an interaction between the measuring probe 260 and the object 201.

In embodiments of the present invention wherein the measuring probe 260 is adapted for atomic force microscopy, the measuring probe 260 may comprise a measuring probe actuator (not shown) adapted to excite elastic oscillations of the measuring probe 260. If the measuring tip 262 interacts with the surface of the object 201, amplitude, frequency and/or phase of the oscillation may depend on the strength of the interaction between the measuring tip 262 and the surface of the object 201, in particular on the distance between the measuring tip 262 and the surface of the object 201. In such embodiments, the drive controller 240 may be adapted to control the actuator 232 in such a manner that the frequency, amplitude and/or phase of the oscillation of the measuring tip 262 are substantially constant.

In embodiments wherein the measuring probe 260 is adapted for scanning tunneling microscopy, the drive controller 240 can be adapted such that an amperage of a tunnel current flowing between the measuring tip 262 and the object 201 is substantially constant. As persons skilled in the art know, the amperage of the tunnel current may be representative of a distance between the measuring tip 262 and the surface of the object 201.

In embodiments wherein the measuring probe 260 is adapted for optical near field microscopy, the drive controller 240 can be adapted such that an intensity of light scattered at the measuring tip 262 is substantially constant. To measure the intensity of light scattered at the measuring tip 262, a near-field measuring unit similar to the near-filed measuring unit 130 described above with reference to FIG. 1 may be used. As persons skilled in the art know, the intensity of light scattered at the measuring tip 262 may depend on an interaction between the optical near field of the measuring tip 262 and the surface of the object 201.

Hence, the drive controller 240 may control the actuator 232 such that the position of the measuring probe and, thus, also the position of the reflective element 261 are modified in such a manner that the strength of the interaction between the measuring tip 262 and the surface of the object 201 is substantially constant.

The measuring instrument 200 may further comprise a controller 242 which is adapted to control the operation of the relative movement unit 203. Thus, the object 201 may be moved relative to the measuring probe 260 for scanning the surface of the object 201 by means of the measuring probe 260. During the scanning process, due to the operation of the actuator 232 by the drive controller 240, the measuring probe 260 may exhibit motions which are representative of a surface profile and/or a position dependent strength of the interaction between the measuring tip 262 and the surface of the object 201.

Consequently, by detecting motions of the measuring probe 260 while scanning the surface of the object 201 with the measuring probe 260, the surface profile and/or the dependence of the strength of the interaction between the measuring tip 262 and the surface of the object 201 on position may be determined. Additionally, an optical far-field image of the object 201 may be obtained by means of the optical observation unit 210. Thus, the object 201 may be investigated both by means of optical far-field imaging techniques providing a relatively large field of view at a resolution limited by the wavelength of light, and by means of techniques of scanning microscopy which may provide a relatively high resolution but may have a relatively small field of view.

Figure 2A:
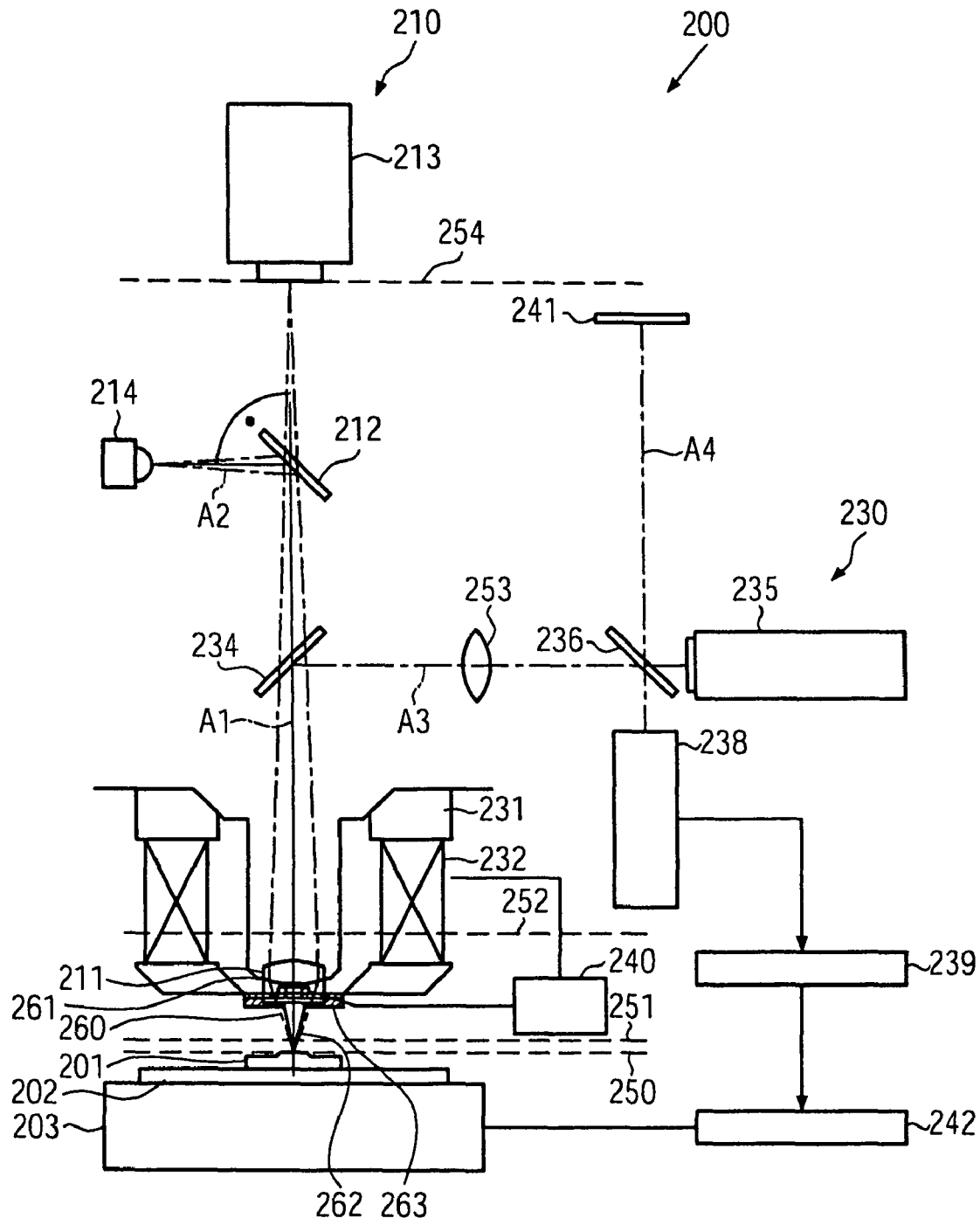
FIG. 2a shows a schematic cross-sectional view of a measuring instrument according to an embodiment of the present invention.
Figure 2B:
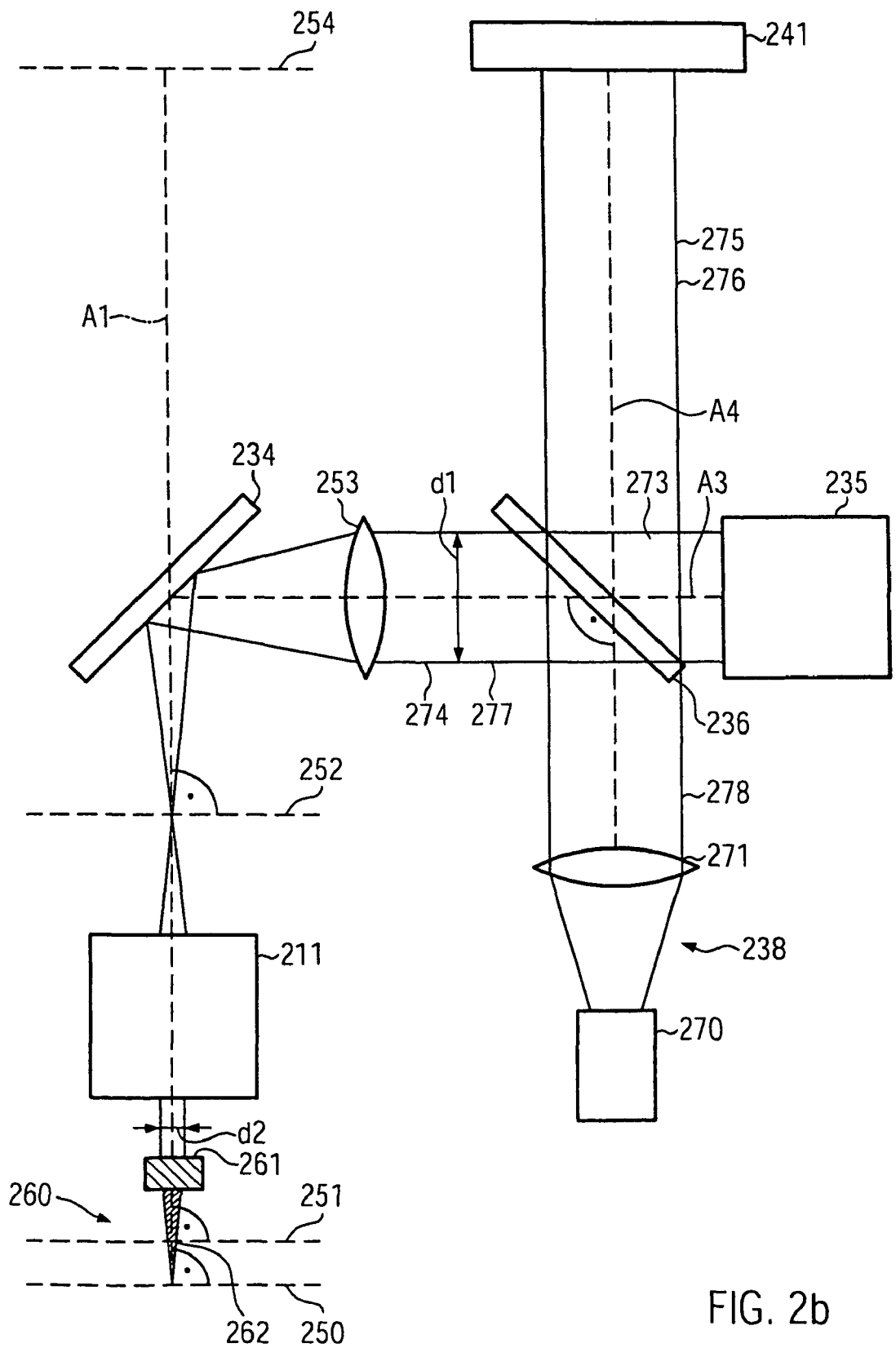

The measuring instrument 200 further comprises a measuring probe position measuring unit 230, which will be described in the following with reference to FIGS. 2a and 2b. FIG. 2b shows a schematic view of the optical path of light in the measuring probe position measuring unit 230. For facility of inspection, some components of the measuring instrument 200 have been omitted in FIG. 2b.

The measuring probe position measuring unit 230 comprises a light source 235 adapted to emit an input beam 273 along an optical axis A3 which may, in some embodiments, be substantially perpendicular to the optical axis A1 of the objective lens 211. The light source 235 can be adapted such that the input beam 273 has a relatively large coherence length, and may be adapted to emit light within a relatively narrow wavelength band. Additionally, the light source 235 may be adapted such that the input beam 273 is substantially collimated.

In some embodiments, the light source 235 may comprise a laser adapted to emit highly coherent and substantially monochromatic light, for example a helium-neon laser. As persons skilled in the art know, laser light may also have a relatively small divergence, thus being substantially collimated.

In other embodiments, the light source 235 may be a light source other than a laser, for example a mercury vapor lamp. In such embodiments, the light source 235 may comprise optical elements such as lenses, mirrors and/or diaphragms for producing a substantially collimated input beam 273.

The measuring probe position measuring unit 230 further comprises a beam splitter 236 adapted to split the input beam 273 into a measurement beam 274 and a reference beam 275. In some embodiments, the beam splitter 236 can be adapted such that an intensity of the measurement beam 274 and the reference beam 275 are substantially equal.

The beam splitter 236 can be configured to transmit a portion of the input beam, which propagates along the optical axis A3. In the embodiment shown in FIGS. 2a and 2b, the transmitted portion of the input beam 273 forms the measurement beam 274. Another portion of the input beam 273 may be reflected by the beam splitter 236 to form the reference beam 275. In some embodiments, the beam splitter 236 may be adapted such that the reference beam 275 propagates along an optical axis A4 substantially perpendicular to the optical axis A3 and substantially parallel to the optical axis A1. A reflective surface or interface of the beam splitter 236 can be substantially planar such that the reference beam 275 is substantially collimated.

The measuring probe position measuring unit 230 further comprises a reference reflector 241 adapted to reflect the reference beam 275 back towards the beam splitter 236. The reference reflector 241 can be configured such that the reflected reference beam 276 is substantially collimated and propagates in a direction opposite the direction of the reference beam 275. In some embodiments, the reference reflector 241 comprises a planar mirror having a reflective surface being perpendicular to the optical axis A4. In other embodiments, the reference reflector 241 can comprise a retroreflector adapted to reflect light incident on the retroreflector in a direction opposite the direction of incidence, for example a cateye reflector.

The measurement beam 274 is focused on the reverse focal plane 252 of the objective lens 211. For this purpose, the measuring probe position measuring unit 230 can comprise a focusing optical element 253, which may, for example, be provided in form of one or more lenses, and a wavelength selective mirror 234. The wavelength selective mirror 234 is arranged along the optical axis A1 of the objective lens 211 and adapted to reflect light having a wavelength within a predetermined wavelength band. The wavelength band of reflection of the wavelength selective mirror 234 may comprise the wavelength band wherein the light source 235 emits light, such that the measurement beam 274 is reflected by the wavelength selective mirror 234.

In embodiments wherein the light source 235 is adapted to emit substantially monochromatic light, the wavelength selective mirror 234 may be adapted to selectively reflect light having the wavelength of light emitted by the light source 235.

The wavelength selective mirror 234 and the focusing element 253 can be arranged such that a length of an optical path between the focusing element 253 and the reverse focal plane 252 is substantially equal to the focal length of the focusing element 253, and the reflective surface of the wavelength selective mirror 234 can be substantially planar. Thus, the substantially collimated measurement beam 274 may be focused to a point lying in the reverse focal plane of the objective lens 211.

In some embodiments, the measurement beam 274 can be focused to the reverse focal point of the objective lens 211. For this purpose, an optical axis of the focusing element 253 can be aligned with the optical axis A3, and the substantially planar reflective surface of the wavelength selective mirror 234 can be arranged at an intersection between the optical axis A3 and the optical axis A1, wherein the reflective surface is substantially normal to a bisector of the angle between the optical axis A3 and the optical axis A1.

The present invention, however, is not limited to embodiments wherein the measurement beam 274 is focused to the reverse focal point of the objective lens 211. In other embodiments, the measurement beam may be focused to another point in the reverse focal plane 252.

Since the measurement beam 274 is focused to a point in the reverse focal plane 252 of the objective lens 211, rays of the measurement beam 274 intersect at the point lying in the reverse focal plane 252. Therefore, as detailed above, the measurement beam 274 is collimated by the objective lens 211, such that rays of the measurement beam 274 are substantially parallel at a side of the objective lens 211 facing the object plane 250.

After being collimated by the objective lens 211, the measurement beam 274 impinges on the reflective element 261 of the measuring probe 260 and is reflected by the reflective element 261.

A ratio between a diameter d1 of the collimated measurement beam 274 between the beam splitter 236 and the focusing element 253 and a diameter d2 of the measurement beam 274 on the side of the objective lens 211 facing the object plane 250 may be influenced by features of the focusing element 253 and the objective lens 211, for example by the focal length and/or the magnification thereof. In some embodiments, the diameter d2 can be smaller than the diameter d1.

In some embodiments, the focusing element 253 and the objective lens 211 are adapted such that the diameter d2 of the measurement beam is equal to or less than a diameter of the reflective element 260. Thus, substantially the entire measurement beam 274 can be reflected by the reflective element 260. This may help to reduce a loss of light of the measurement beam 274, and may help to avoid undesirable reflections of the measurement beam 274 at the surface of the object 201 to be investigated.

The reflective element 261 can be adapted such that the measurement beam 274 is reflected in a direction opposite the direction of incidence of the measurement beam 274 on the reflective element 161. Thus, the reflected measurement beam 277 may follow substantially the same beam path as the measurement beam 274.

If the measurement beam 274 is focused on the reverse focal point of the objective lens, the collimated measurement beam obtained at the object side of the objective lens 211 can be substantially parallel to the optical axis A1 of the objective lens 211. In such embodiments, the reflected measurement beam 277 may be parallel to the optical axis A1 while propagating in the opposite direction as the measurement beam 274 if the reflective element 261 comprises a planar reflective surface perpendicular to the opposite axis A1.

If the measurement beam 274 is focused on a point lying in the reverse focal plane 252 of the objective lens other than the reverse focal point, the collimated measurement beam 274 obtained at the object side of the objective lens 211 may be oblique to the optical axis A1, wherein an angle between the optical axis A1 and the collimated measurement beam 274 may increase with increasing distance between the optical axis A1 and the point to which the measurement beam 274 is focused. In such embodiments, the reflected measurement beam 277 propagates in a direction opposite the propagation direction of the measurement beam 274, following the same beam path as the incident measurement beam 274, if the reflective element 261 is inclined relative to the optical axis A1.

In some embodiments, the point lying in the reverse focal plane 252 to which the measurement beam 274 is focused may be adjusted such that the reflected measurement beam 277 follows the same beam path as the incident measurement beam 274. For this purpose, the wavelength selective mirror 234 and/or the focusing element 253 may be moved. Thus, manufacturing errors of the measuring probe 260 and/or errors of alignment of the measuring probe 260 to the optical axis A1 of the objective lens 211 may be compensated.

In other embodiments, the reflective element 261 may comprise a retroreflector adapted to reflect the measurement beam 274 in a direction opposite the direction of incidence of the measurement beam 273 for a relatively large range of angles of incidence. For example, the reflective element 261 can comprise a cateye reflector of a type known to persons skilled in the art. Advantageously, this may help to increase a tolerance of the measuring probe position measuring unit 230 with respect to alignment errors of the measuring probe 260 and/or other components of the measuring instrument 200.

After being reflected at the reflective element 261, the reflected measurement beam 277 is focused by the objective lens 211. Since the reflected measurement beam 277 may still be collimated after being reflected at the reflective element, the reflected measurement beam 277 may be focused to a point lying in the reverse focal plane 252 of the objective lens 211, and may be collimated again by the focusing element 253. Thereby, the diameter of the reflected measurement beam 277 may be increased such that, after collimation by the focusing element 253, the diameter of the reflected measurement beam 277 is substantially equal to the diameter d1 of the measurement beam 274 between the beam splitter 236 and the focusing element 253.

A portion of the reflected measurement beam 277 is reflected at the beam splitter 236, and a portion of the reflected reference beam 276 is transmitted by the beam splitter 236. The portion of the reflected measurement beam 277 reflected at the beam splitter 236 and the portion of the reflected reference beam 276 transmitted by the beam splitter 236 may propagate in substantially the same direction along the optical axis A4. Thus, a superimposed beam 278 is formed.

A difference between the length of the optical path of the measurement beam 274 and the reflected measurement beam 277 on the one hand and the length of the optical path of the reference beam 275 and the reflected reference beam 276 on the other hand may be smaller than the coherence length of the light from the light source 235. Thus, when the superimposed beam 278 is formed, the reflected measurement beam 277 and the reflected reference beam 276 may interfere with each other.

The measuring probe position measuring unit 230 may comprise means 238 for detecting the interference between the reflected measurement beam 277 and the reflected reference beam 276. In embodiments of the present invention wherein the beam splitter 236 is a non-polarizing beam splitter, the means for detecting the interference between the reflected measurement beam 277 and the reflected reference beam 276 may comprise means for measuring an intensity of the superimposed beam 278 which may, in some embodiments, be provided in form of a light sensor 270 (for example, a photodiode) and a lens 271 adapted to focus the superimposed beam 278 on the light sensor 270.

If the phase difference between the reflected measurement beam 277 and the reflected reference beam 276 is substantially an integer multiple of $2\pi$, corresponding to a difference between the optical path lengths covered by the measurement beam 274 and the reflected measurement beam 277 on the one hand, and the reference beam 275 and the reflected reference beam 276 on the other hand equal to zero or an integer multiple of the wavelength of the light emitted by the light source 235, a constructive interference between the reflected measurement beam 277 and the reflected reference beam 276 is obtained, leading to a high intensity of light measured by the light sensor 270.

If the phase difference between the reflected measurement beam 277 and the reflected measurement beam 276 is equal to $2\pi n+\pi$, wherein n is an integer, corresponding to a difference of the optical path lengths of $(2n+1)\lambda$, wherein n is an integer and $\lambda$ is the wavelength of the light emitted by the light source 235, a destructive interference between the reflected measurement beam 277 and the reflected reference beam 276 is obtained, leading to a low intensity of light measured by the light sensor 270.

For an intermediate phase difference between the reflected measurement beam 277 and the reflected reference beam 276, an intermediate intensity of light can be measured by the light sensor 270.

If the reflective element 261 of the measuring probe 260 is moved in the direction of the optical axis A1 of the objective lens 211 due to the operation of the actuator 232 effected by the drive controller 240 when the surface of the object 201 is scanned, the length of the optical path of the measurement beam 274 and the reflected measurement beam 277 is modified, whereas the length of the optical path of the reference beam 275 and the reflected reference beam 276 may remain substantially unmodified. Thus, the phase difference between the reflected measurement beam 277 and the reflected reference beam 276 is altered.

Therefore, the motion of the measuring probe 260 and, accordingly, the surface profile and/or the position dependent strength of the interaction between the measuring tip 262 and the surface of the object 201 may be detected by measuring the interference of the superimposed beam 278.

Further embodiments of the present invention will be described with reference to FIGS. 3a to 3b.

Figure 3A:
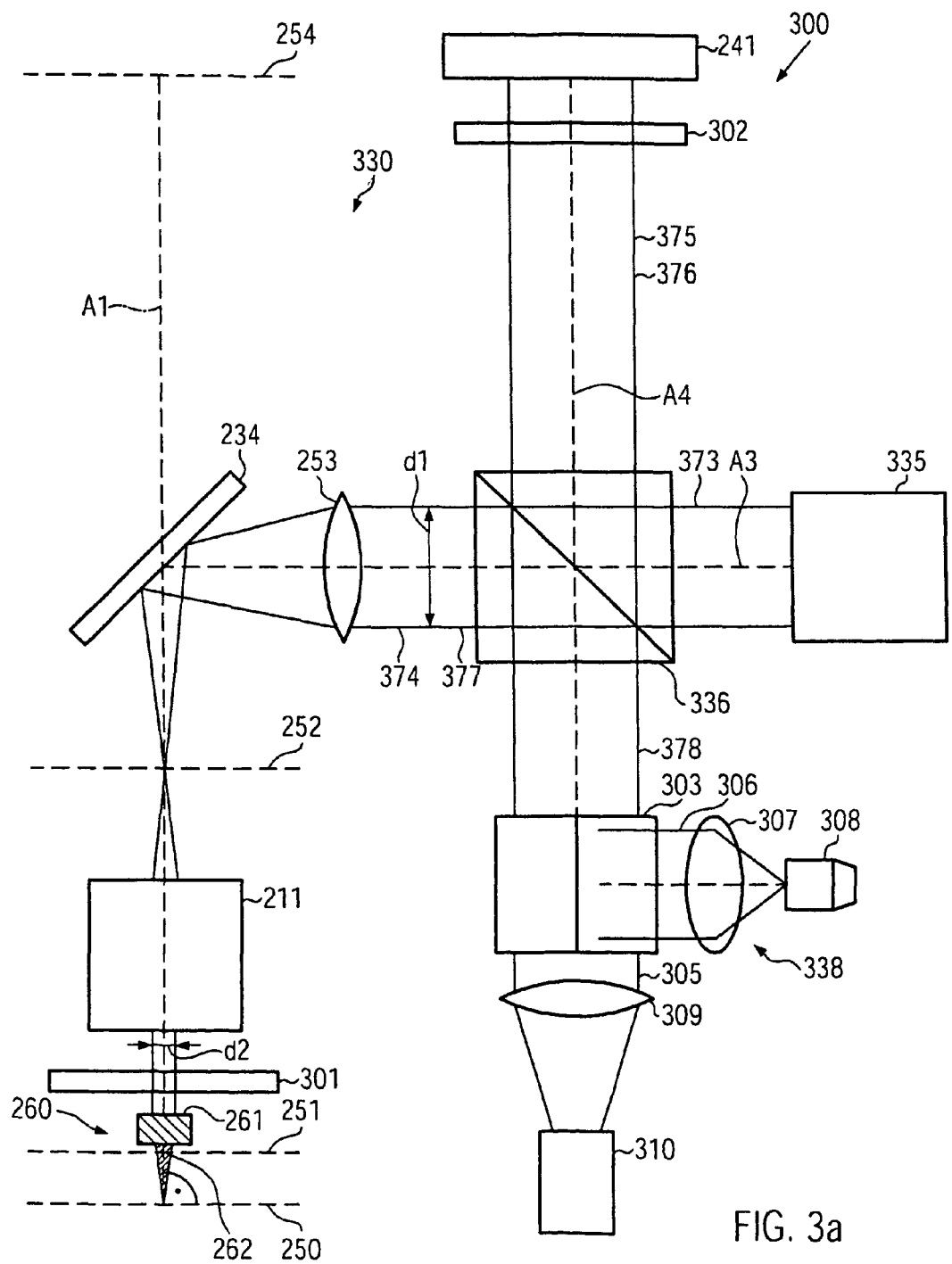
FIG. 3a shows a schematic view of an optical path in a measuring instrument according to another embodiment of the present invention.

FIG. 3a shows a schematic view of an optical path of light in a measuring probe position measurement unit 330 of a measuring instrument 300 according to another embodiment of the present invention. Components of the measuring instrument 300 not being part of the measuring probe position measuring unit 330 may have features corresponding to those of corresponding components in the measuring instrument 200 described above with reference to FIGS. 2a and 2b. For convenience, in FIG. 3a, similar to FIG. 2b, some components of the measuring instrument 300 have been omitted for facility of inspection. In FIG. 3b, polarization directions of light in the measuring probe position measuring unit 330 are shown.

The measuring probe position measuring unit 330 comprises a light source 335 adapted to emit an input beam 373, a polarizing beam splitter 336 for forming a measurement beam 374 and a reference beam 375, a reference reflector 241 adapted to reflect the reference beam 375 towards the polarizing beam splitter 336, and means 338 for detecting an interference between a reflected measurement beam 377 obtained by reflection of the measurement beam 374 at the reflecting element 261 of the measuring probe 260 and the reflected reference beam 376.

Additionally, the measuring probe position measuring unit 330 comprises means for focusing the measurement beam 374 on the reverse focal plane 252 of the objective lens 211 such that the measurement beam 374 is collimated by the objective lens 211. The means for focusing the measurement beam 374 can be provided in form of a focusing element 253 and a wavelength selective mirror 234.

The reference mirror 241, the focusing element 253, the wavelength selective mirror 234, the objective lens 211 and the measuring probe 260 may have features corresponding to those of the respective components of the measuring instrument 200 described above with reference to FIGS. 2a and 2b.

The polarizing beam splitter 336 is adapted such that the measurement beam 374 and the reference beam 375 are linearly polarized. An initial polarization direction of the measurement beam 374, which is obtained as the measurement beam 374 is leaving the polarizing beam splitter 336, can be substantially orthogonal to an initial polarization direction of the reference beam 375 which is obtained as the reference beam 375 is leaving the polarizing beam splitter 375.

The light source 335 can be adapted to emit light having a first polarization component in the initial polarization direction of the measurement beam 374 and a second polarization component in the polarization direction of the reference beam 375. In some embodiments, the light source 335 may be configured to emit linearly polarized light having a polarization direction intermediate the initial polarization directions of the measurement beam 374 and the reference beam 375. In other embodiments, the light source 335 can be adapted to emit substantially unpolarized light or elliptically polarized light, for example circularly polarized light.

Figure 3B:
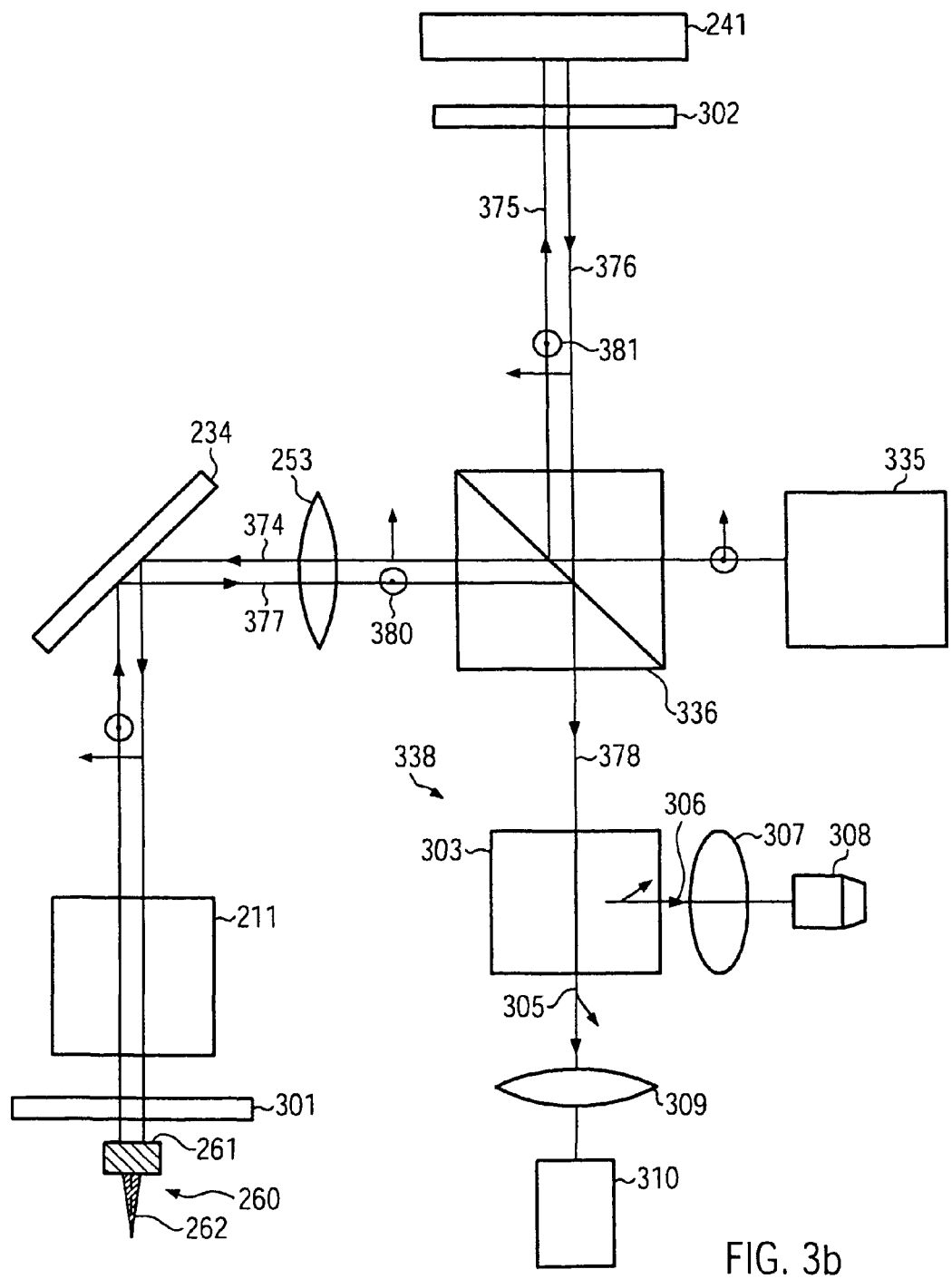
FIG. 3b shows a schematic view of the optical path in the measuring instrument shown in FIG. 3a illustrating the polarization of light in the measuring instrument.

The initial polarization direction of the measurement beam 374 may be substantially within a plane spanned by the optical axis A1 and the optical axis A3, which is the plane of drawing of FIG. 3b, as illustrated schematically by arrow 380. The initial polarization direction of the reference beam 375 may be perpendicular to the plane spanned by the optical axis D1 and the optical axis A3, as illustrated schematically by symbol 381 in FIG. 3b. As usual in the field of optics, the symbol 381 is to be interpreted as an arrow perpendicular to the plane of drawing and pointing towards the observer The present invention is not restricted to embodiments wherein the initial polarization direction of the measurement beam 374 is within the plane of drawing of FIG. 3b and the polarization direction of the reference beam 375 is perpendicular to the plane of drawing of FIG. 3b. In other embodiments, the initial polarization direction of the measurement beam 374 may be perpendicular to the plane of drawing and the initial polarization direction of the reference beam 375 may be within the plane of drawing, or both polarization directions may be oblique to the plane of drawing.

In some embodiments, the polarizing beam splitter 336 may be adapted to reflect light having a polarization direction lying within a first plane and to transmit light having a polarization direction lying within a second plane. For example, the polarizing beam splitter 336 may transmit light having a polarization direction within the plane of drawing of FIG. 3b and may reflect light having a polarization direction perpendicular to the plane of drawing of FIG. 3b.

In embodiments wherein the initial polarization direction of the measurement beam 374 is within the plane of drawing of FIG. 3b, the polarization direction of the measurement beam 374 may remain within the plane of drawing as the measurement beam 374 is focused by the focusing element 253, reflected by the wavelength selective mirror 234 and collimated by the objective lens 211.

The measuring probe position measuring unit 330 may comprise a lambda quarter plate 301 provided between the objective lens 211 and the measuring probe 260. An optical axis of the lambda quarter plate 301 may be oblique to the polarization direction of the measurement beam 374. For example, the optical axis of the lambda quarter plate 301 and the polarization direction of the measurement beam 374 may include an angle of approximately 45 degrees. Thus, after having passed the lambda quarter plate 301, the measurement beam 374 may be circularly polarized.

In some embodiments, the lambda quarter plate 301 may be attached to the measuring probe 260.

After the measurement beam 374 has passed the lambda quarter plate 301, it is reflected by the reflective element 261 of the measuring probe 261, and passes the lambda quarter plate 301 for a second time before being focused by the objective lens 211. After passing the lambda quarter plate 301, the reflected measurement beam 377 is linearly polarized, having a polarization direction perpendicular to the initial polarization direction of the measurement beam 374.

In embodiments wherein the initial polarization direction of the measurement beam is within the plane of drawing of FIG. 3b, the polarization direction of the reflected measurement beam may be perpendicular to the plane of drawing after the reflected measurement beam 377 has passed the lambda quarter plate 301, and may remain within the plane of drawing as the reflected measurement beam 377 is focused by the objective lens 211, reflected by the wavelength selective mirror 234 and collimated by the focusing element 253.

The measuring probe position measuring unit 330 further comprises a lambda quarter plate 302 provided between the polarizing beam splitter 336 and the reference mirror 241. As the reference beam 375 passes the lambda quarter plate 302, it obtains a circular polarization. After being reflected at the reference mirror 241, the reflected reference beam 376 is also circularly polarized. As the reflected reference beam 376 passes the lambda quarter plate 302, it obtains a linear polarization having a polarization direction perpendicular to the initial polarization direction of the reference beam 375. Hence, in embodiments wherein the initial polarization direction of the reference beam 375 is perpendicular to the plane of drawing of FIG. 3b, the polarization direction of the reflected reference beam 376 that is obtained after the reflected reference beam 376 has passed the lambda quarter plate 302 is within the plane of drawing.

Due to the modification of the polarization state of the measurement beam 374, the reflected measurement beam 377, the reference beam 375 and the reflected reference beam 376, when arriving at the polarizing beam splitter 336, the reflected measurement beam 377 has a polarization direction lying in the same plane as the initial polarization direction of the reference beam 375, and the reflected reference beam 376 has a polarization direction lying in the same plane as the initial polarization direction of the measurement beam 374.

Thus, in embodiments wherein the polarizing beam splitter 336 is adapted to transmit light having a polarization direction lying in a first plane for forming the measurement beam 374 and to reflect light having a polarization direction lying in a second plane for forming the reference beam 375, the reflected measurement beam 377 may be reflected at the polarizing beam splitter 336 and the reflected reference beam 376 may be transmitted by the polarizing beam splitter 336. Conversely, in embodiments wherein the measurement beam 374 is reflected by the polarizing beam splitter 336 and the reference beam 375 is transmitted by the polarizing beam splitter 336, the reflected measurement beam 377 may be transmitted by the polarizing beam splitter 336 and the reflected reference beam 376 may be reflected by the polarizing beam splitter 336.

Hence, at the polarizing beam splitter 336, the reflected measurement beam 377 and the reflected reference beam 376 are superimposed with each other to form a superimposed beam 378, wherein the superimposed beam 378 propagates in a direction other than the direction from the polarizing beam splitter 336 towards the light source 335.

Portions of the measurement beam 374 and/or the reflected measurement beam 377 may be reflected at optical components of the measuring instrument 300 other than the reflective element 261 of the measuring probe 260. For example, portions of the measurement beam 374 may be reflected at optical surfaces of the focusing element 253 and/or optical surfaces of the objective lens 211. A polarization direction of portions of the measurement beam 374 which are reflected before the measurement beam passes the lambda quarter plate 301 may lie within the same plane as the initial polarization direction of the measurement beam 374.

A polarization direction of portions of the reflected measurement beam 377 which are reflected by optical components after the reflected measurement beam 377 has passed the lambda quarter plate 301 may lie within the same plane as the polarization direction of the reflected measurement beam 377. Such portions of the reflected measurement beam 377, however, are reflected towards the measuring probe 260, and arrive at the polarizing beam splitter 336 only after being reflected at the reflective element 261 of the measuring probe 260. Thereby, the reflected portions of the reflected measurement beam 377 pass the lambda quarter plate 301 twice, such their polarization direction is rotated by 90 degrees again.

Consequently, all portions of the reflected measurement beam 377 which are reflected between the polarizing beam splitter 336 and the lambda quarter plate 301 have a polarization direction lying in the sample plane as the initial polarization direction of the measurement beam 374.

Thus, when arriving at the polarizing beam splitter 336, portions of the measurement beam 374 and the reflected measurement beam 377 reflected at optical surfaces of the focusing element 253 and the objective lens 211 have a polarization direction which is perpendicular to the polarization direction of the reflected measurement beam 377, and are not directed into the propagation direction of the superimposed beam 378 by the polarizing beam splitter 336. For example, they may be directed towards the light source 335. Thus, undesirable reflections of the measurement beam 374 and the reflected measurement beam 377 may be eliminated. This may help to improve an accuracy of the measurement of the position of the measuring probe 260.

When the superimposed beam 378 is formed, the reflected measurement beam 377 and the reflected reference beam 376 interfere with each other. Due to the interference, the polarization direction of the superimposed beam 378 may depend on the length of the optical path of the measurement beam 374 and the reflected measurement beam 377, as will be explained in the following with reference to FIGS. 4a and 4b.

Figure 4A:
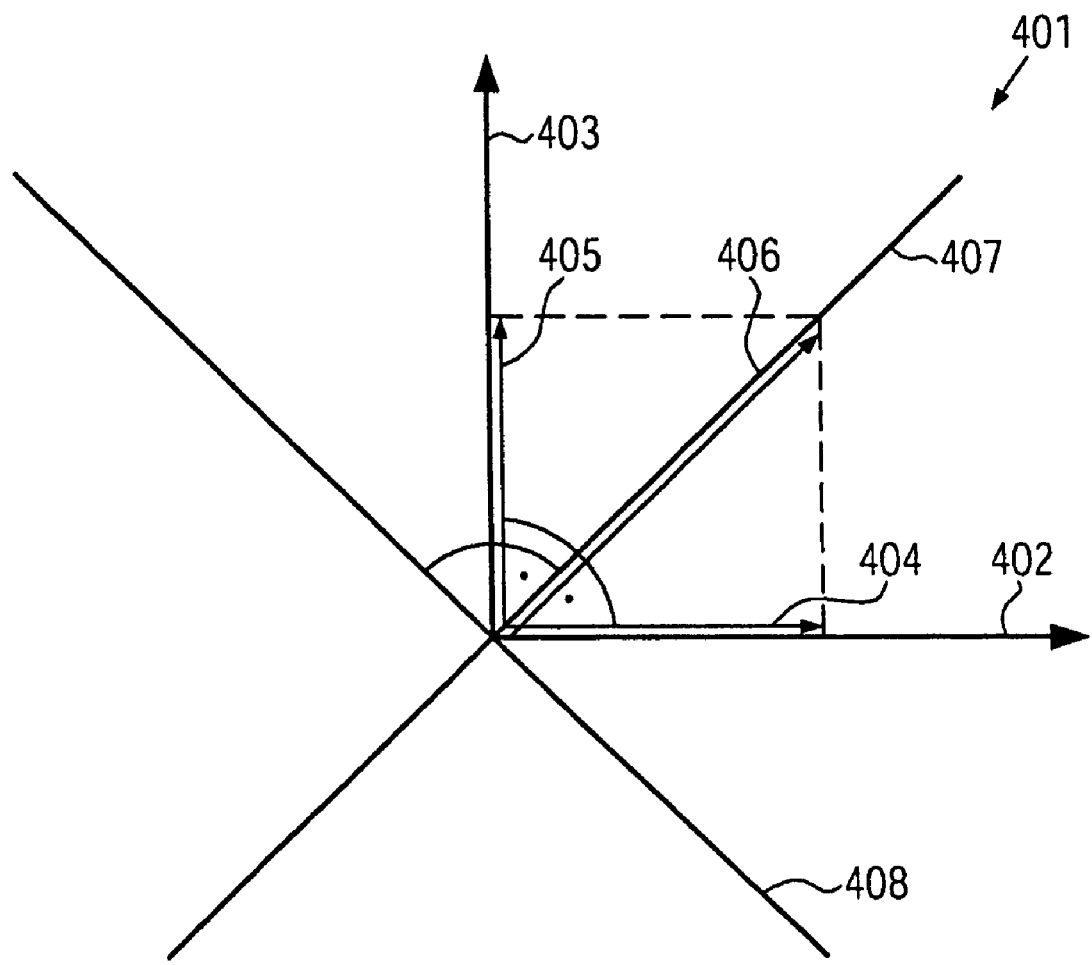
FIGS. 4a and 4b show schematic drawings illustrating the polarization of a superimposed beam formed in the measuring instrument shown in FIGS. 3a and 3b.

FIG. 4a shows a diagram 401 illustrating the superposition of the reflected measurement beam 377 and the reflected reference beam 376 in the case of a phase difference between the reflected measurement beam 377 of $2\pi n$, wherein n is an integer such that the reflected measurement beam 377 and the reflected reference beam 376 are in phase. A first coordinate axis 402 denotes components of the electrical field lying in the plane of polarization of the reflected reference beam 376 and a second coordinate axis 403 denotes components of the electrical field lying in the plane of polarization of the reflected measurement beam 377. An arrow 404 illustrates the electrical field of the reflected reference beam 376 and an arrow 405 illustrates the electrical field of the reflected measurement beam 377. An arrow 406 illustrates the electrical field of the superimposed beam 378, which is obtained by vector addition of the electrical fields 404, 407.

Figure 4B:
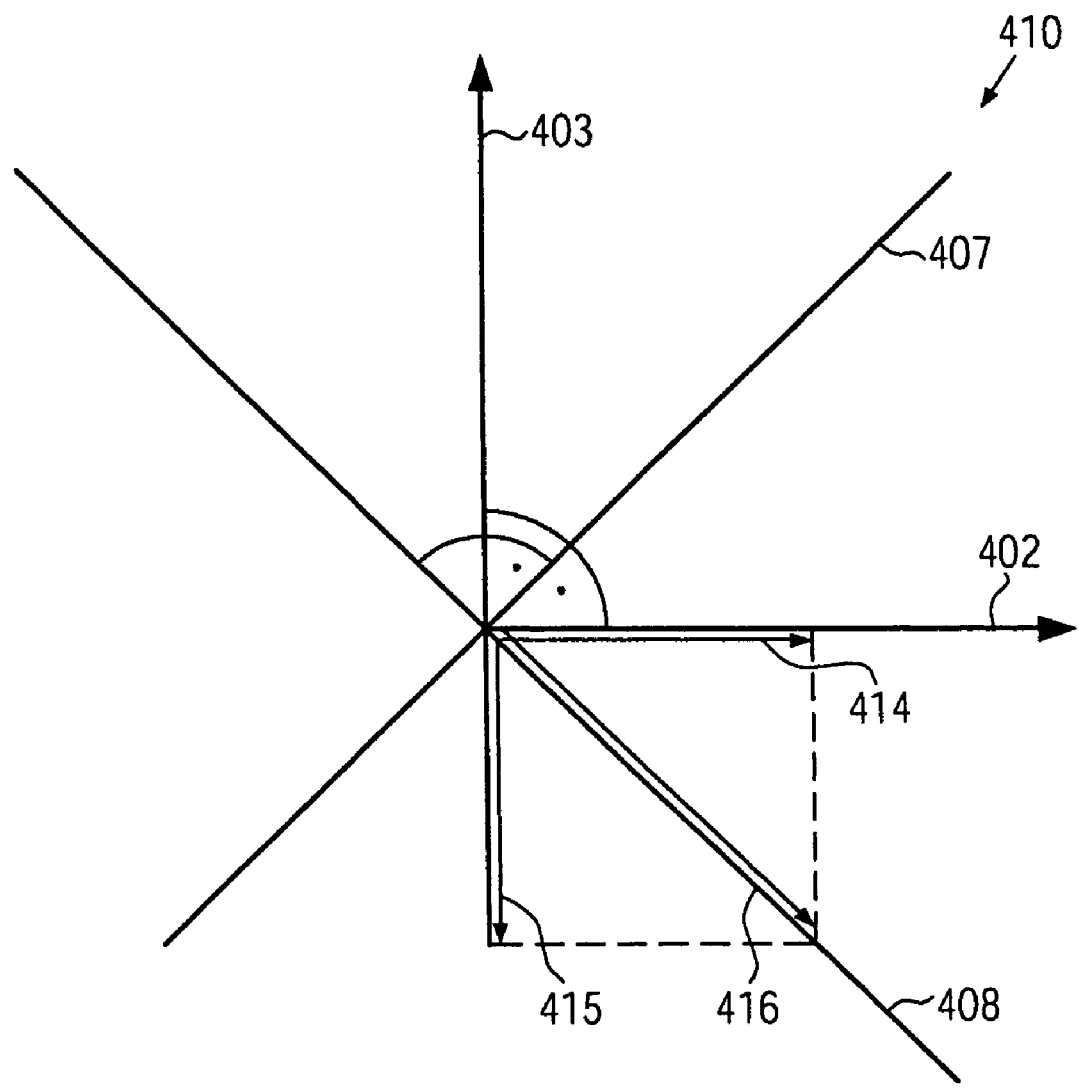

FIG. 4b shows a diagram 410 illustrating the superposition of the reflected measurement beam 377 and the reflected reference beam 376 in the case of a phase difference between the reflected reference beam 376 and the reflected measurement beam 377 of $2\pi n+\pi$, wherein n is an integer such that the reflected measurement beam 377 and the reflected reference beam 376 are inversely phased. Similar to FIG. 4a, the first coordinate axis 402 denotes components of the electrical field lying in the plane of polarization of the reflected reference beam 376 and the second coordinate axis 403 denotes components of the electrical field lying in the plane of polarization of the reflected measurement beam 377. Arrow 414 illustrates the electrical field of the reflected reference beam 376, arrow 415 illustrates the electrical field of the reflected measurement beam 377 and arrow 416 illustrates the electrical field of the superimposed beam 378.

Compared to the situation shown in FIG. 4a, in the situation shown in FIG. 4b, the electrical field of the reflected measurement beam 377 points in the opposite direction, whereas the electrical field of the reflected reference beam 376 points in the same direction. For approximately equal intensities of the reflected reference beam 376 and the reflected measurement beam 377, the electrical field 406 that is obtained if the reflected measurement beam 377 and the reflected reference beam 376 are in phase is substantially orthogonal to the direction of the electrical field 416 that is obtained if the reflected measurement beam 377 and the reflected reference beam 376 are inversely phased.

Hence, in the situation illustrated in FIG. 4a, the superimposed beam 378 is linearly polarized, wherein the polarization direction is within a plane 407 that includes an angle of approximately 45 degrees with the polarization direction of the reference beam 376. In the situation illustrated in FIG. 4b, the superimposed beam 378 is linearly polarized with a polarization direction lying in a plane 408 that includes an angle of approximated 135 degrees with the polarization direction of the reference beam 376 and is substantially orthogonal to the plane 407.

For a phase difference between the reflected reference beam 376 and the reflected measurement beam 377 intermediate a phase difference of $2\pi n$ and $2\pi n+\pi$, the superimposed beam 378 may be elliptically or circularly polarized.

The measuring probe position measuring unit 330 comprises means 338 for detecting the interference between the reflected measurement beam 377 and the reflected reference beam 376. In some embodiments, the means 338 for detecting the interference may comprise a first light detector 308, for example a photodiode and a polarizer 303. The means 338 for detecting the interference may further comprise a second light detector 310, which may also comprise a photodiode.

In some embodiments, the polarizer 303 may be provided in form of a polarizing beam splitter adapted to reflect light having a first polarization direction towards the first light detector 308 and to transmit light having a second polarization direction to the second light detector 310. Lenses 307, 309 may be provided between the polarizer 303 and the light detectors 308, 310 for focusing light reflected and light transmitted by the polarizer 303, respectively, on the first light detector 308 and the second light detector 309, respectively.

The polarizer 303 may be oriented such that the first polarization direction is substantially parallel to one of the planes 407, 408 shown in FIGS. 4a and 4b, and the second polarization direction is substantially parallel to the other of the planes 407, 408. Thus, the first light detector 308 may, in some embodiments, measure an intensity of a polarization component having a polarization direction including an angle of approximately 45 degrees with the polarization direction of the reflected reference beam 376, whereas the second light detector 310 may measure an intensity of a polarization component of the superimposed beam 378 having a polarization direction including an angle of approximately 135 degrees with the polarization direction of the reflected reference beam 375.

If the measuring probe 260 is moved in a direction parallel to the optical axis A1 of the objective lens 211 and the phase difference between the reflected reference beam 376 and the reflected measurement beam 377 is altered accordingly, the intensities measured by the first light detector 308 and the second light detector 310 may vary in a periodic manner with a phase shift of approximately $\pi/2$ between the intensity measured by the first light sensor 308 and the intensity measured by the second light sensor 310. In some embodiments, the intensity measured by the first light sensor 308 may have a substantially cosinusoidal dependence of the position of the measuring probe 260 and the intensity measured by the second light sensor 310 may have a substantially sinusoidal dependence on the position of the measuring probe 260. This may allow to infer a direction of movement of the measuring probe 260 from the intensities measured by the light sensors 308, 309, and may help to improve a precision of the measurement at positions of the measuring probe 260 wherein the intensity measured by one of the light detectors 308, 310 is close to a maximum or minimum.

The present invention is not limited to embodiments wherein the polarizer 303 comprises a polarizing beam splitter. In other embodiments, the polarizer 303 may comprise a non-polarizing beam splitter, and polarization filters of a type known to persons skilled in the art may be provided between the non-polarizing beam splitter and the light detectors 308, 309.

Furthermore, the present invention is not limited to embodiments wherein the wavelength selective mirror 234 is used to focus the measurement beam 374 on the reverse focal plane 252 of the objective lens 211. In other embodiments, a beam splitter may be used for this purpose. In further embodiments, a swing mirror may be used. The swing mirror may be movable into the optical path of the objective lens 211 for measuring the position of the measuring probe 260, and may be moved out of the optical path of the objective lens 211 for inspection of the measuring probe by means of the optical observation unit 210.

The invention claimed is:

1. A method of detecting a movement of a measuring probe provided between an objective lens adapted to image an object plane on a predetermined image plane and said object plane, comprising:
   splitting an input beam of light into a measurement beam and a reference beam;
   focusing said measurement beam to a point lying in a reverse focal plane of said objective lens such that said measurement beam is collimated by said objective lens;
   reflecting said collimated measurement beam at said measuring probe, said reflected measurement beam being directed towards said objective lens such that said objective lens focuses said reflected measurement beam to a point lying in said reverse focal plane;
   collimating said reflected measurement beam;
   superimposing said collimated reflected measurement beam and said reference beam to form a superimposed beam; and
   detecting an interference between said reflected measurement beam and said reference beam.

2. A method as in claim 1, further comprising:
   utilizing a polarizing beam splitter for splitting said input beam, wherein said polarizing beam splitter is adapted such that said measurement beam and said reference beam are linearly polarized, wherein an initial polarization direction of said measurement beam is orthogonal to an initial polarization direction of said reference beam;

modifying a polarization state of said measurement beam and said reflected measurement beam such that a polarization direction of said reflected measurement beam is orthogonal to the initial polarization direction of the measurement beam; and modifying a polarization state of said reference beam to obtain a polarization direction of said reference beam orthogonal to the initial polarization direction of the reference beam, wherein said polarization states are modified before forming said superimposed beam.

3. A method as in claim 2, wherein said polarization states of said measurement beam and said reflected measurement beam are modified between said objective lens and said measuring probe.

4. A method as in claim 2, wherein said input beam comprises at least one of unpolarized light, elliptically polarized light and linearly polarized light having a polarization direction intermediate the initial polarization direction of the measurement beam and the initial polarization direction of the reference beam.

5. A method as in claim 1, further comprising:
selecting a first polarization component of said superimposed beam, said first polarization component having a polarization direction intermediate the polarization direction of the reflected measurement beam obtained after the modification of the polarization state of the reflected measurement beam and the polarization direction of the reference beam obtained after the modification of the polarization state of the reference beam; and
measuring an intensity of said first polarization component.

6. A method as in claim 5, further comprising:
selecting a second polarization component of said superimposed beam, said second polarization component having a polarization direction orthogonal to the polarization direction of the first polarization component; and
measuring an intensity of said second polarization component.

7. A method as in claim 1, wherein said input beam comprises light within a predetermined wavelength band, and wherein said method further comprises:
providing a wavelength selective mirror adapted to reflect light within said predetermined wavelength band along an optical axis of said objective lens, said wavelength selective mirror being arranged between said objective lens and said image plane;
reflecting said measurement beam into a direction parallel to said optical axis of said objective lens toward said objective lens by means of said wavelength selective mirror;
reflecting said reflected measurement beam from said objective lens into a direction angled to said optical axis of said objective lens by means of said wavelength selective mirror; and
imaging an object located in said object plane by means of said objective lens using light having a wavelength outside said predetermined wavelength band.

8. A measuring instrument, comprising:
an objective lens adapted to image an object plane on a predetermined image plane;
a light source adapted to emit an input beam;
a beam splitter adapted to split said input beam into a measurement beam and a reference beam;
at least one optical element that focuses said measurement beam to a point lying in a reverse focal plane of said objective lens such that said measurement beam is collimated by said objective lens;
a reference reflector adapted to reflect said reference beam towards said beam splitter; and
a measuring probe having a reflective element located between said objective lens and said object plane, wherein said reflective element is adapted to reflect said collimated measurement beam back towards said objective lens such that said objective lens focuses said reflected measurement beam to a point lying in said reverse focal plane and said at least one optical element redirects said reflected measurement beam towards said beam splitter; wherein
said beam splitter is adapted to superimpose said reflected reference beam and said reflected measurement beam to form a superimposed beam; and
said measuring instrument further comprises at least one light detector that detects an interference of said reflected reference beam and said reflected measurement beam superimposed with each other.

9. A measuring instrument as in claim 8, wherein said beam splitter comprises:
a polarizing beam splitter adapted to form a linearly polarized measurement beam and a linearly polarized reference beam, wherein an initial polarization direction of said measurement beam is orthogonal to an initial polarization direction of said reference beam;
a first lambda quarter plate that modifies a polarization state of said measurement beam and said reflected measurement beam such that a polarization direction of said reflected measurement beam is orthogonal to the initial polarization direction of the measurement beam; and
a second lambda quarter plate that modifies a polarization state of said reference beam and said reflected reference beam such that a polarization direction of said reflected measurement beam is orthogonal to the initial polarization direction of the reference beam;
wherein said first lambda quarter plate is provided between said objective lens and said measuring probe.

10. A measuring instrument as in claim 9, wherein said light source is adapted to provide at least one of an unpolarized input beam, an elliptically polarized input beam and a linearly polarized input beam having a polarization direction intermediate the polarization direction of the measurement beam and the polarization direction of the reference beam.

11. A measuring instrument as in claim 9, wherein said polarizing beam splitter is adapted to reflect light having a polarization direction lying in a first plane and to transmit light having a polarization direction lying in a second plane orthogonal to the first plane.

12. A measuring instrument as in claim 9, wherein said at least one light detector comprises:
a first detector adapted to produce a first signal representative of an intensity of light impinging thereon; and
a polarizer adapted to select light having a third polarization direction intermediate the polarization direction of the reflected measurement beam after the modification of the polarization of the measurement beam and the polarization direction of the reflected reference beam after the modification of the polarization of the reflected measurement beam and to supply said light having said third polarization direction to said first detector.

13. A measuring instrument as in claim 12,
further comprising a second detector adapted to produce a second signal representative of an intensity of light impinging thereon;

wherein said polarizer is further configured to select light having a fourth polarization direction orthogonal to the third polarization direction and to supply said light having said fourth polarization direction to said second detector.

14. A measuring instrument as in claim 13, wherein said polarizer comprises a polarizing beam splitter adapted to reflect one of said light having said third polarization direction and said light having said fourth polarization direction and to transmit the other of said light having said third polarization direction and said light having said fourth polarization direction.

15. A measuring instrument as in claim 8, wherein said light source is adapted to emit light within a predetermined wavelength band, and wherein said at least one optical element comprises:

a focusing optical element adapted to focus said measurement beam; and
a wavelength selective mirror arranged along an optical axis of said objective lens, said wavelength selective mirror being adapted to reflect light within said predetermined wavelength band, wherein said wavelength selective mirror is provided along an optical axis of said objective lens and oriented such that light from said focusing optical element is reflected towards said objective lens.

* * * * *

UNITED STATES PATENT AND TRADEMARK OFFICE
CERTIFICATE OF CORRECTION

PATENT NO. : 8,345,260 B2
APPLICATION NO. : 12/461810
DATED : January 1, 2013
INVENTOR(S) : Hartmut Illers et al.

It is certified that error appears in the above-identified patent and that said Letters Patent is hereby corrected as shown below:

Title Page, item 73 Assignee: The last word in the final Assignee's name should be changed from "Bundesan" to --Bundesanstalt--.

Signed and Sealed this
Twenty-sixth Day of March, 2013

Teresa Stanek Rea
*Acting Director of the United States Patent and Trademark Office*